United States Patent [19]
Crawford

[11] Patent Number: 5,461,297
[45] Date of Patent: Oct. 24, 1995

[54] SERIES-PARALLEL SWITCHABLE CAPACITOR CHARGING SYSTEM

[75] Inventor: Ian D. Crawford, Longwood, Fla.

[73] Assignee: Analog Modules, Inc., Longwood, Fla.

[21] Appl. No.: 65,994

[22] Filed: May 24, 1993

[51] Int. Cl.⁶ .................................................. H02M 7/217
[52] U.S. Cl. .................... 320/1; 363/67; 323/234
[58] Field of Search .................... 320/1, 56, 57; 307/16; 323/234, 299; 363/67, 68, 69, 143

[56] References Cited

U.S. PATENT DOCUMENTS

| | | | |
|---|---|---|---|
| 3,106,672 | 1/1963 | Mills | 320/1 |
| 3,654,537 | 4/1972 | Coffey | 320/1 |
| 3,694,731 | 9/1972 | Cherry | 363/68 |
| 3,984,750 | 10/1976 | Pfeffer et al. | 363/67 |
| 4,009,431 | 2/1977 | Johnson | 363/69 X |
| 4,339,704 | 7/1982 | McSparran et al. | 363/67 X |
| 4,429,357 | 1/1984 | Häusler et al. | 363/68 |
| 5,398,182 | 3/1985 | Crosby | 363/89 |

FOREIGN PATENT DOCUMENTS

| | | | |
|---|---|---|---|
| 55-86380 | 6/1980 | Japan | 363/67 |
| 1-286800 | 11/1989 | Japan . | |
| 0907720 | 2/1982 | U.S.S.R. | 363/68 |

*Primary Examiner*—Peter S. Wong
*Assistant Examiner*—Robert Nappi
*Attorney, Agent, or Firm*—Gerald E. Linden

[57] ABSTRACT

In a capacitor charging system having multiple rectified outputs of secondary (transformer) windings, the rectified outputs are connected in parallel for enhanced charging of an energy-storage capacitor below a threshold voltage, and are connected in series above the threshold voltage. In the parallel mode, forward biased diodes connected from rectifier-to-rectifier effect the parallel connection. In the series mode, a switch closure effectively connects the rectifiers in series, which reverse biases the diodes. For switching two or more rectified outputs, the number of switch closures required is one less than the secondary windings. Multiple windings (and rectifiers) can be paired and switched, and two or more thresholds can be employed.

19 Claims, 8 Drawing Sheets

SERIES-PARALLEL SWITCHABLE CAPACITOR CHARGING SYSTEM

TECHNICAL FIELD OF THE INVENTION

The invention relates to power supplies, more particularly to power supplies for charging a capacitor, such as employed in a pulsed laser system.

BACKGROUND OF THE INVENTION

Certain high voltage power supply applications require that a capacitor be charged to a high voltage, and subsequently rapidly discharged through a device. Examples include xenon flash-tubes (such as are commonly used in lab strobes, photo-flash units, etc.), pulsed lasers (medical, industrial, military, and scientific applications), and other types of discharge devices. Discharges from solid state pulsed lasers, for example are often accomplished by firing a flash tube surrounding a solid state laser rod.

Capacitors are often used for such applications because high voltage capacitors are relatively easy to obtain, and because capacitors can be discharged extremely rapidly (by drawing current from the capacitor). (Other applications which discharge the capacitor more slowly are also possible.) The frequency with which the capacitor may be discharged, i.e., the discharge rate (e.g., pulse rate on a strobe light or laser, frame rate on a camera photo-flash unit) is limited, at least in part, by the rate at which the capacitor can be charged (made ready for discharge) by an associated charging power supply.

As is well known, the voltage across a capacitor increases as the product of the capacitance value of the capacitor and the integral with respect to time of the current through the capacitor. Consequently, the greater the capacitance, the longer it takes to charge the capacitor through a given voltage increase across the capacitor for a given charging current. Conversely, the greater the charging current, the more rapidly a capacitor can be charged. The charge (in coulombs) on a capacitor is equal to the product of the voltage across the capacitor and the value of the capacitor. The amount of electrical energy stored in a capacitor (in joules or watt-seconds) is equal to one half the product of the capacitance value and the square of the voltage across the capacitor.

High output devices, e.g., high output pulsed lasers, require corresponding large amounts of energy from each discharge of the capacitor from which they receive their pulse energy. Although it is certainly possible to build up the energy in the capacitor (charge the capacitor) slowly, this is often undesirable. Many applications (e.g., medical surgical lasers) require rapid pulsed operation. Rapid pulsed operation requires rapid charging of the capacitor, requiring correspondingly high current from the capacitor-charging power supply.

If a conventional voltage regulated power supply were to be used to charge energy storage capacitors, an inordinately large and heavy power supply would be required. In order to prevent excessive current surges (high inrush currents which occur upon connection to a completely discharged capacitor), an inductive choke must be connected in series with the charging current. The choke is typically large and heavy in its own right. As a result of the high weight of the power supply, such systems are not well suited for applications such as airborne pulsed laser systems. Resistively charged systems exhibit relatively low efficiency, which can be a significant disadvantage in a battery powered system (choke systems can be efficient, but resistive systems have 50% typical efficiency.

A capacitor charging system which addresses the problems of surge current and size, in part, is described in U.S. Pat. No. 3,654,537, (hereinafter "COFFEY"), incorporated by reference herein. COFFEY describes a technique whereby an energy storage capacitor is charged in a series of successive steps, each of a higher voltage level than the preceding step. According to COFFEY, power from each of a series of unequal secondary windings of a transformer is rectified and selectively switched into a stacked series arrangement. By selectively enabling (switching in) the windings in various combinations, the capacitor can be charged in a number of controlled voltage steps effectively limiting surge currents without requiring large inductors. Current into the capacitor is maintained at a relatively constant level over the charging cycle. Further, charging efficiency is considerably improved.

A disadvantage of COFFEY is that it does little to increase the output current of the supply into the capacitor. Another disadvantage of COFFEY, is that at any given time, a number of the windings of the transformer may not be in use, implying a rather poor size to charging-rate ratio for the transformer. Since the rate of energy transfer into a capacitor for a given current is proportional to the voltage across the capacitor, the COFFEY technique transfers the most energy in the last part of the charging cycle (which makes intuitive sense, since the last part of the cycle is when more of the secondary winding are switched in). As a result, the load seen at the primary of the transformer increases throughout the charging cycle.

Another approach is shown in Japanese Patent No. 1-286800 (hereinafter TAKENAKA). In TAKENAKA, a pair of windings of a generator block are first connected in parallel, and then in series. The output is rectified and used to charge a capacitor. When the capacitor is in its fully discharged state, the parallel winding combination is used, providing roughly double the current which could be supplied by a single winding alone. When the voltage across the capacitor reaches a critical point (related to the single winding voltage for the transformer) the two windings are switched into a series configuration, halving the current carrying capacity of the combined windings, but doubling the voltage. The rectified voltage from the series combination charges the capacitor for the remainder of the charging cycle.

The TAKENAKA approach has the advantages (e.g., over COFFEY) of maintaining both windings "active" at all times, and providing a more constant and optimal rate of energy transfer to the capacitor, thereby improving the size to charging-rate ratio for the transformer and speeding up the charging cycle. Nevertheless, the TAKENAKA approach suffers from significant disadvantages. In order to switch the (two) windings from a series to a parallel configuration, three FET (field effect transistor switches) are required. The controls for these switches can be rather cumbersome and expensive. Further, since the rectifier must handle both the series and parallel coil winding combinations, it must be capable of handling both high current and high voltage.

DISCLOSURE OF THE INVENTION

It is therefore an object of the present invention to provide an improved technique for rapidly charging an energy storage capacitor.

In is another object of the present invention to provide an improved technique for series-parallel switching of charging stages for charging an energy storage capacitor.

It is another object of the present invention to provide a high-voltage energy storage capacitor charging technique which reduces the number of components subjected to high voltages and/or high currents thereby reducing the required power and voltage ratings of those components.

It is another object of the present invention to provide a technique for charging an energy storage capacitor which accommodates series-parallel switching of more than two charging stages.

It is another object of the present invention to provide a series-parallel technique for charging an energy storage capacitor which requires only a single switch to effect the series-parallel switchover.

It is another object of the present invention to provide an improved technique for charging an energy storage capacitor in more than two steps.

It is another object of the present invention to draw a more even power load during the charging of the capacitor.

According to the invention, a series/parallel switchable charging system for an energy storage capacitor is employed in conjunction with a transformer having two or more secondary windings. Each of the secondary windings is separately rectified, providing a positive output and a negative output associated with each winding.

If there are two secondary windings, the positive output associated with a first of these two secondary windings is designated a positive charging output and is connected to a positive terminal of a capacitor to be charged. The negative output associated with the other, or second, secondary winding is designated a negative charging output and is connected to a negative terminal of the capacitor to be charged.

Two diodes and a switch provide means for switching the two secondary windings into a parallel conducting configuration when the switch is open or, alternatively, into a series conducting configuration when the switch is closed. A first diode is anode-connected to the positive output associated with the second secondary winding and cathode-connected to the positive output associated with the first secondary winding. The other, or second, diode is anode connected to the negative output associated with the second secondary winding and cathode-connected to the negative output associated with the first secondary winding. The switch is connected between the negative output associated with the first secondary winding and the positive output associated with the second secondary winding.

When the switch is closed, both diodes are reverse biased, and the positive and negative outputs associated with the two secondary windings are effectively connected, via the switch, in a series configuration. When the switch is opened, however, the series connection is broken and the diodes conduct (forward bias), effectively connecting the positive and negative outputs associated with the two secondary windings into a parallel configuration.

A voltage monitor controls closure of the switch according to a monitored voltage. If the voltage is higher than a preset threshold voltage, then the switch is closed. As stated hereinabove, the rate of energy transfer into a capacitor is proportional, at a given level of charging current, to the voltage across the capacitor. Assuming that the monitored voltage is the voltage across the capacitor, this provides greater charging current during the early part of the charging cycle (when the switch is open), but when the capacitor voltage increases, a higher-voltage, lower-current charging current configuration of the windings is implemented. As a result of this "automatic" switching, charging efficiency (as measured according to the rate of energy transfer into the capacitor) is improved.

If more than two secondary windings are to be switched in parallel, then two of the secondary windings are designated as first and second, as before, and the diode connections to the first and second secondary windings are connected as described above except that each diode is replaced with a pair of diodes in series. The switch connection is made differently, as described below. For each secondary winding, one diode is anode-connected to the positive output associated with the secondary winding and cathode connected to the positive output associated with the first secondary winding. Also for each secondary winding, another diode is cathode-connected to the negative output associated with the secondary winding and anode-connected to the negative output associated with the second secondary winding. A number of switches one less than the number of secondary windings is provided and connected such that each switch connects between the negative output associate with one secondary winding and the positive output associated with another. The switch connections are further made such that no output is connected to more than one switch, and such that no switch is connected to either the positive output associated with the first secondary winding or the negative output associated with the second secondary winding.

If all of the switches are closed, all of the diodes are reverse-biased, and the positive and negative outputs associated with the secondary windings are effectively connected in series. If all of the switches are opened, the series connection is broken, the diodes conduct, and all of the outputs associated with the secondary windings are effectively connected in parallel. In the parallel configuration, the combination provides "n" times as much current capability as any single winding alone, where "n" is the number of secondary windings used.

According to an aspect of the invention, the aforementioned "diodes" are referred to in terms of the broadest meaning of "diode" as a rectifying device. Any suitable polarity-sensitive rectifying device may be employed.

According to another aspect of the invention, the "switch" may be either mechanical (e.g., a relay) or electronic, such as, a field effect transistor, a bipolar transistor, an insulated gate bipolar transistor, etc.. Preferably an electronic switch is used. The term "electronic switch" is intended to encompass any suitable switching device comprising active electronic devices.

According to another aspect of the present invention, pairs of windings can be series-parallel switched as described above, and then connected such that the switched pairs may in turn be series-parallel switched. This provides for more "levels" (or steps) of charging current and voltage, and further improves charging efficiency.

In this configuration, a voltage monitor operates to connect all of the windings in a series configuration when the monitored voltage is above a first threshold, and all of the windings in a parallel configuration when the voltage is below a second threshold, lower than the first threshold. In between, the monitor connects the windings either as a series-connected pair of parallel-connected windings, or a parallel-connected pair of series-connected windings.

When a capacitor is charged at a constant current, the power required goes from zero (at zero volts) to twice the average value (at the maximum voltage). This "sawtooth" power demand causes higher RMS (root-mean-square) input currents for a given average energy resulting in a poor power factor, which requires the power distribution system to be rated for higher currents. By switching the output winding, the power draw can have several maxima, just prior to a switching event, thus smoothing the flow of input power and improving the power factor.

Other objects, features and advantages of the invention will become apparent in light of the following description thereof.

BRIEF DESCRIPTION OF THE DRAWINGS

FIGS. 1b and 1c are schematic diagrams exemplary of various functional blocks in the block diagram of FIGS. 1a.

DETAILED DESCRIPTION OF THE INVENTION

Figure 1A:
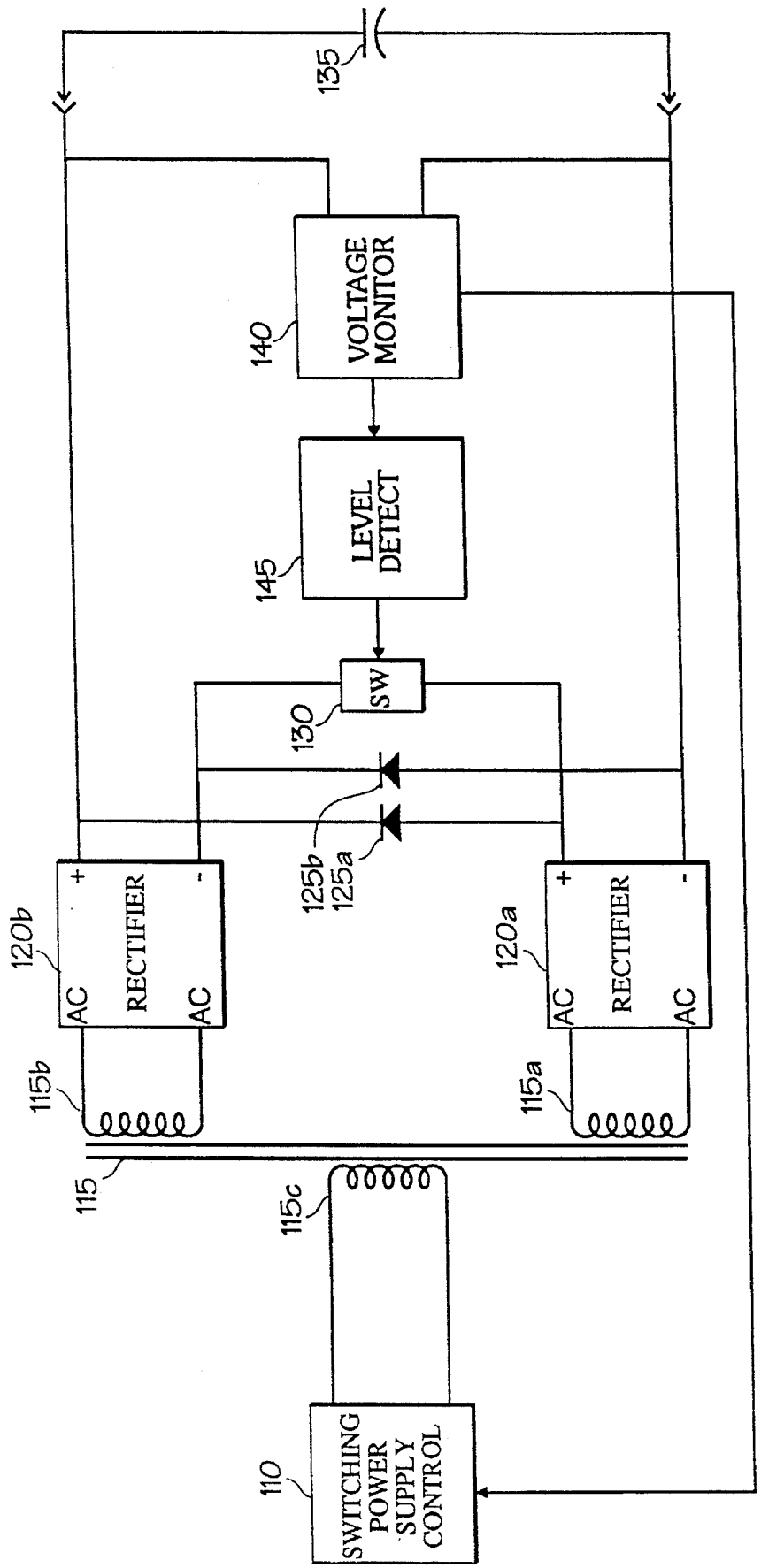
FIG. 1a is a block diagram of a charging system for an energy-storage capacitor, according to the invention.

FIG. 1a is a block diagram of a series-parallel switchable energy-storage capacitor charging system, according to the invention. A switching power supply controller 110 (or power oscillator) drives a primary winding 115c of a transformer 115 having two secondary windings 115a and 115b. The secondary windings 115a and 115b each have the same number of turns. Alternating current (AC) from one of the two secondary windings 15a is rectified by a first rectifier 120a (preferably a full-wave rectifier), while AC current from the other secondary winding 115b is rectified by a second rectifier 120b. Each rectifier 120a and 120b has a positive (+) and a negative (−) output.

A switch 130 is connected from the positive (+) output of the first rectifier 120a to the negative (−) output of the second rectifier 120b. The switch is preferably an electronic switch, (such as an FET or bipolar transistor) but may be an electromechanical (e.g., relay) switching device.

An energy storage capacitor 135 is connected across the positive (+) output of the second rectifier 120b and the negative (−) output of the first rectifier 120a.

The anode of a first diode 125a is connected to the positive (+) output of the first rectifier 120a, and the cathode of the same diode 125a is connected to the positive (+) output of the second rectifier 120b. The anode of a second diode 125b is connected to the negative (−) output of the first rectifier 120a, and the cathode of the same diode 125b is connected to the negative (−) output of the second rectifier 120b.

A voltage monitor 140 measures the voltage across the energy-storage capacitor 135. A feedback signal from the voltage monitor 140 is connected to the switching power supply controller 110. (This assumes a voltage regulated power supply operation on completion of charging. This connection is not necessary if the circuit is operated open loop using a power oscillator to drive the primary winding 115c). A level detector 145 senses the voltage level on the energy storage capacitor 135 (via the voltage monitor 140) and closes the switch 130 if the voltage across the capacitor 135 is above a predetermined level. (If there is no other use for a voltage monitor output then the voltage monitor 140 and level detector 145 can be combined into a single block.

A single switch (i. e., 130) effects the series-parallel switching of the two windings 115a and 115b (and rectifiers 120a and 120b). When the switch 130 is closed, the diodes 125a and 125b are both reverse biased, and are effectively removed from the circuit, placing the two rectifiers (and windings) into a series-connected configuration. When the switch 130 is open, the two rectifiers (windings) are effectively connected in parallel, and current from the first rectifier 120a flows through the first diode 125a, into a first terminal of the energy storage capacitor 135, and returns via direct connection to the opposite terminal of the capacitor 135. Current from the second rectifier 120b flows directly into the first terminal of the energy storage capacitor 135 and returns via the second diode 125b, which is connected to the opposite terminal of the capacitor 135.

Since only a single switch closure (and two properly connected and oriented diodes) is required, to effect parallel or series connections of two windings (e.g., rectifiers), this represents a considerable simplification over the TAK-ENAKA technique.

It should be noted that neither rectifier 120a or 120b is required to withstand current flow or voltage levels greater than those produced by the single winding 115a or 115b, respectively, to which it is connected. It should also be noted that neither diode 125a or 125b is required to carry current or withstand inverse voltage greater than that produced by a single winding (115a or 115b). This potentially reduces the size, cost, and required power dissipation for the diodes and rectifiers as compared to other switching arrangements which need to be sized to accommodate "doubled up" currents and/or voltages. Single-junction rectifiers are limited in their ability to withstand inverse voltage and are commonly matched and connected in series to accommodate higher voltages. The use of multiple rectifiers in FIG. 1a does not, therefore, represent additional complexity, and may provide a cost reduction by permitting the use of more "standard" (e.g., single-junction) rectifiers. The strategy of using of lower-voltage rectifiers connected in a series configuration usually permits the use of faster devices, thereby improving efficiency and switching speed. This, in turn, permits higher switching frequencies which permit reductions in component sizes (e.g., transformers).

Figure 1B:
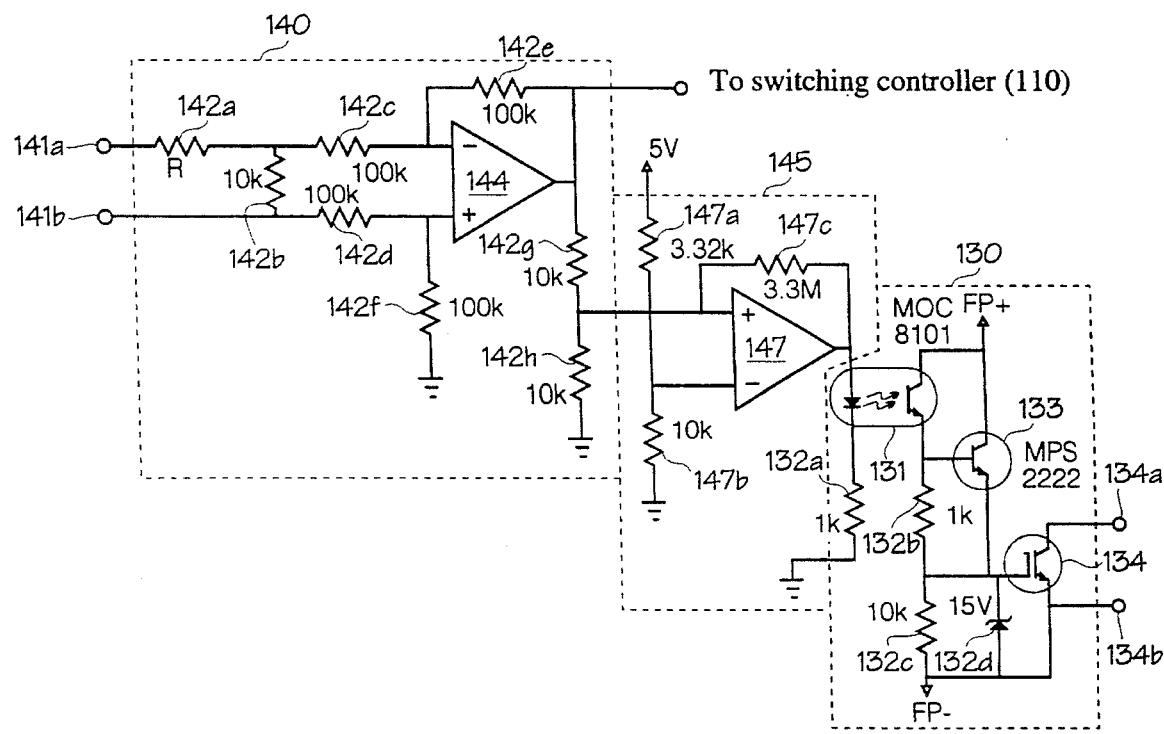

FIG. 1b is a schematic diagram including circuits corresponding to the voltage monitor 140, level detector 145 and switch 130. The circuits shown are merely exemplary of suitable circuits for performing these functions.

The voltage monitor 140 comprises a differential amplifier and a voltage divider. Two input terminals 141a and 141b to the voltage monitor 140 connect to the more positive (top, as shown in FIG. 1a) and more negative (bottom, as shown in FIG. 1a) sides of the capacitor 135, respectively. Resistors 142a and 142b form a voltage divider which scales the (potentially high) voltage across the capacitor 135 down to a level suitable for signal processing. The value of the resistor 142a (R) is determined according to the peak voltage which can be expected across the capacitor, and is typically a very large value causing minimal leakage of current from the capacitor (compared to the discharge current). An operational amplifier 144 and resistors 142c, 142d, 142e and 142f are connected in a differential amplifier configuration to reject any common-mode voltage present at the input terminals, and to provide a single-ended representation of the voltage across the capacitor 135 at the output of amplifier 144. This output voltage is provided as a feedback signal to the switching power supply controller 110 (assuming feedback voltage regulation is used). (If common mode voltages at the inputs 141a and 141b are high enough to do damage to or otherwise cause misoperation of the operational amplifier 144, the resistance R of the resistor 142a can be distributed into two resistors and applied in series with both inputs 141a and 141b.) Resistors 142g and 142h form another voltage divider which scales the voltage at the output of the operational amplifier 144 to a level better suited to threshold detection in the level detector 145 (and simultaneously provides an impedance against which a positive feedback resistor therein can provide hysteresis).

The level detector 145 comprises a differential comparator 147, two resistors 147a and 147b connected as a voltage divider, and a feedback resistor 147c. The voltage divider connects to a 5 V reference voltage, providing a reference voltage of about 3.75 volts at the negative input to the differential comparator 147. The feedback resistor 147c is connected from the output of the differential comparator 147 to the positive input of the comparator 147, which is in turn connected to the signal from the voltage divider in the voltage monitor 140 (at the junction between the two resistors 142g and 142h). Given the component values shown, and assuming a 15 V single-ended supply, the positive feedback provided by the feedback resistor 147c creates a hysteresis band of approximately 20 millivolts in the response of the level detector 145. The output of the differential comparator 147 provides the output signal from the level detector 145, which controls the switch 130.

The switch 130 employs opto-isolation to achieve isolation from the output levels of the charging system. The output signal of the level detector 145 drives a light emitting diode (LED) in an opto-isolator 131. A resistor 132a limits sets the LED current to about 10 ma. The output of the opto-isolator 131 (a phototransistor) is connected in a darlington configuration with a transistor 133 and resistors 132b and 132c and connects to the gate input of an IGBT (insulated gate bipolar transistor, a composite device having MOSFET-like input isolation and a bipolar transistor-like collector and emitter). A zener diode 132d protects the gate input of the IGBT. The collector and emitter 134a and 134b, respectively, of the IGBT act as a directional current switch between the positive output of the first rectifier 120a (FIG. 1a) and the negative output of the second rectifier 120b. Because of the required direction of current flow, the collector 134a connects to the first rectifier 120a and the emitter 134b connects to the second rectifier 120b.

Figure 1C:
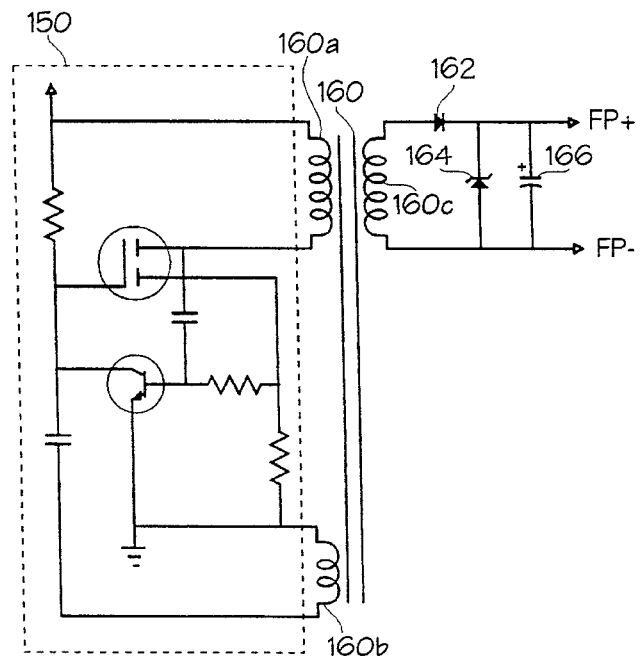

The switch 130 is an active electronic switch, and since it "floats" with the output stages of the charging system, it requires a floating power supply (connected at points marked FP+ and FP−). FIG. 1c is a schematic diagram of a circuit suitable for use as such a floating power supply, and is intended to be merely exemplary of many possible suitable implementations.

The floating supply is essentially a transformer-coupled DC—DC converter comprising an oscillator 150, a transformer 160 with a primary winding 160a, a feedback winding 160b, and a secondary winding 160c. The oscillator 150 (comprising components as shown) operates in conjunction with the primary winding 160a and feedback winding 160b, to provide a driving AC signal into the primary winding 160a. The resulting AC signal at the secondary winding 160c is rectified by a diode 162 and filtered by a capacitor 166. The output voltage of the supply is limited by a zener diode 164.

Figure 2:
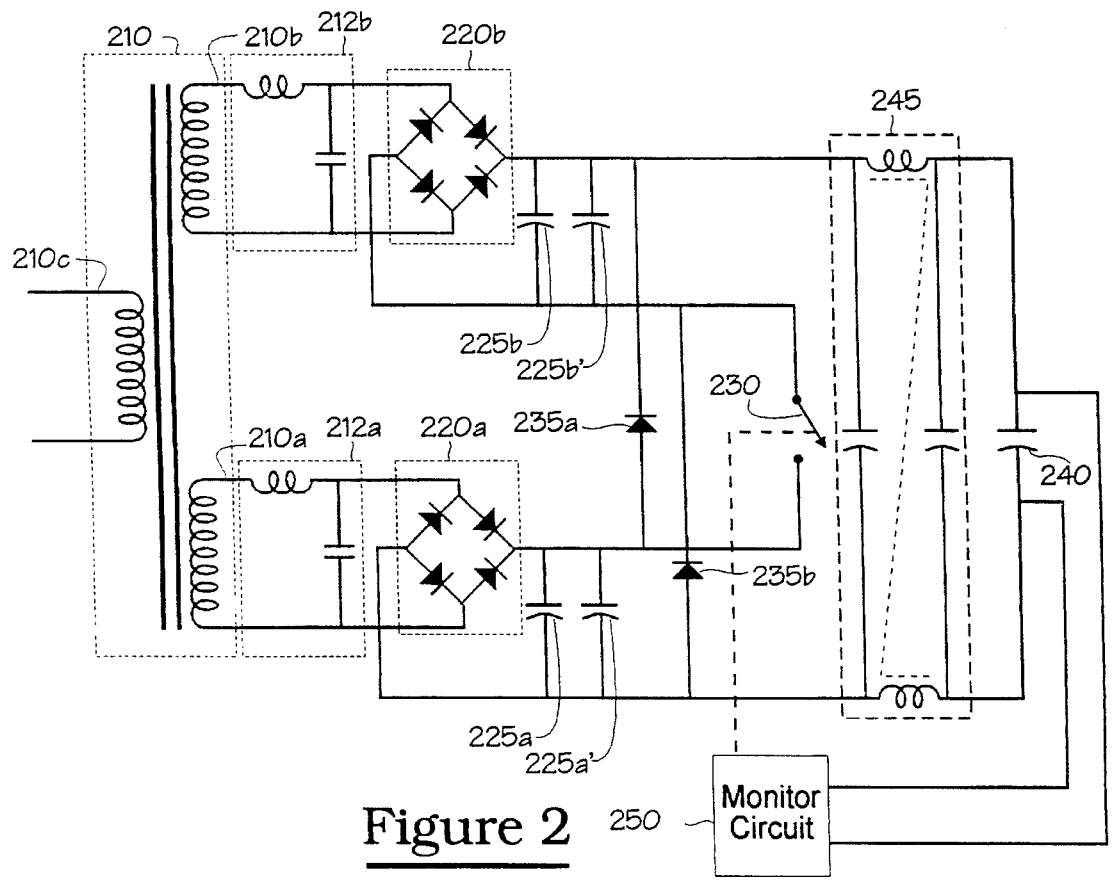
FIG. 2 is a schematic diagram of an output stage of a two-winding series-parallel energy-storage capacitor charging system, according to the invention.
Figure 2A:
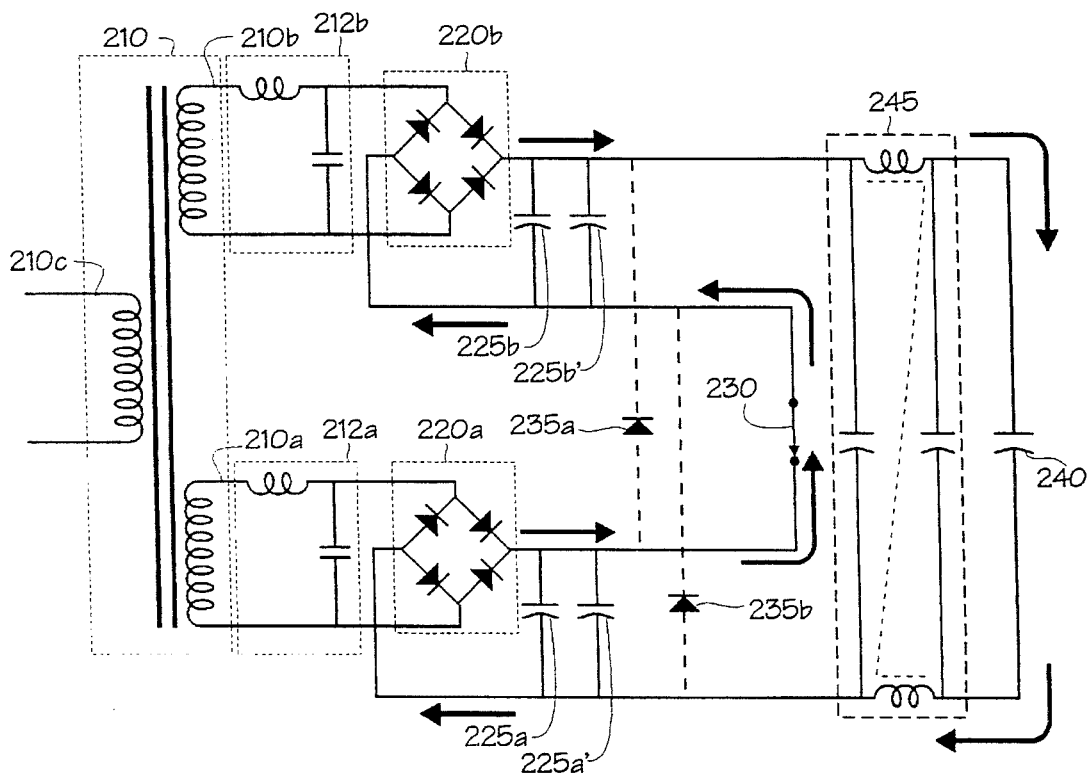
FIG. 2a is a "switch-closed" version of the schematic diagram of FIG. 2, showing current flow in the series output configuration.
Figure 2B:
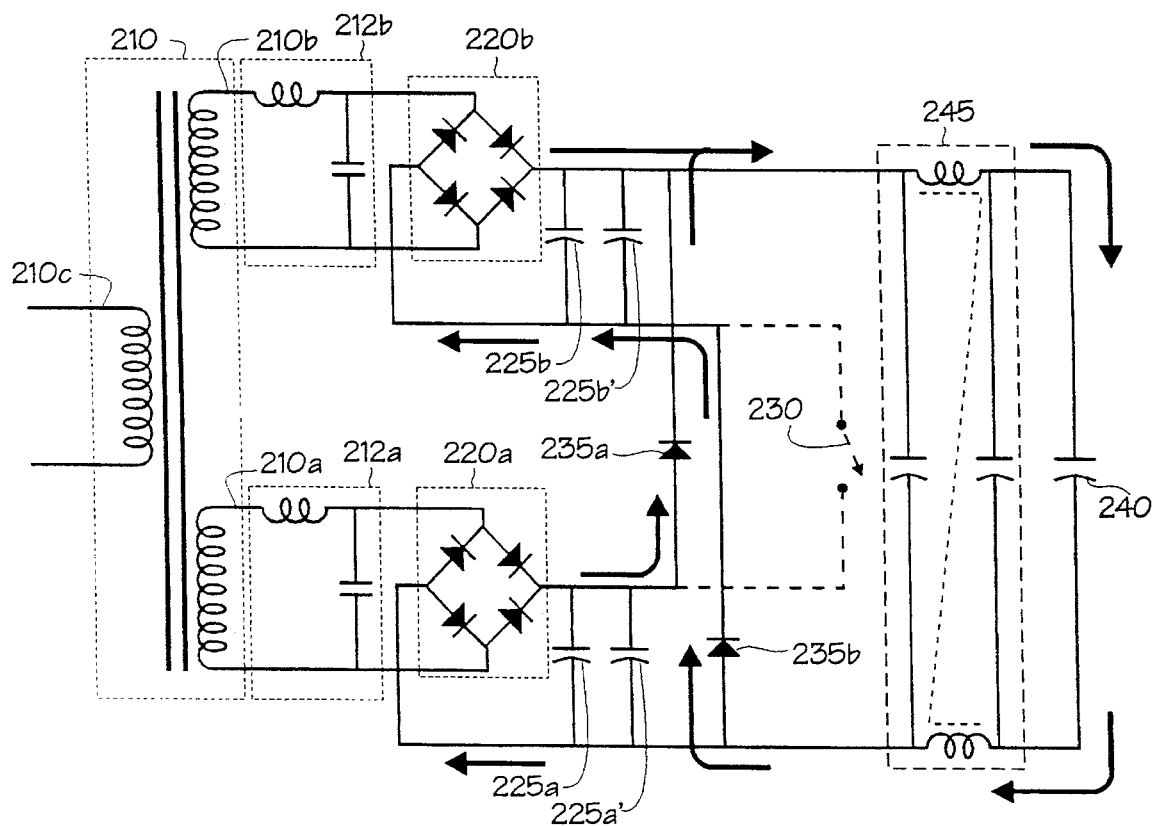
FIG. 2b is a "switch-open" version of the schematic diagram of FIG. 2, showing current flow in the parallel output configuration.

FIGS. 2, 2a, and 2b show the output stages of a two-winding series-parallel charging system for an energy storage capacitor 240 similar to that shown in FIG. 1a, but in greater detail, and including some optional additional elements.

FIG. 2 is a schematic diagram of the output stage showing circuit details for all components except the switch 230 and monitor circuit 250 (which have been described in detail hereinabove). As before, a transformer having two secondary windings 210a and 210b and a single primary winding 210c is used. It is assumed that the primary winding 210c is driven with a suitable AC waveform. The secondary windings 210a and 210b are connected via tuned circuits 212a and 212b, respectively, to full wave rectifiers 220a and 220b, respectively. The (optional) tuned circuits 212a and 212b serve to optimize the current waveform and energy transfer efficiency delivered through the full-wave rectifiers 220a and 220b, respectively, and to limit surge currents. Filter capacitors 225a and 225a' filter the output of rectifier 220a, and filter capacitors 225b and 225b' filter the output of rectifier 220b (These also tend to smooth voltage and current waveforms).

The positive output of the first full-wave rectifier 220a is connected to the anode of a first diode 235a and to one side of a switch 230b (preferably an electronic switch such as that described hereinabove with respect to FIG. 1b, but drawn as a mechanical switch for simplicity). The negative output of the first rectifier 220a is connected directly to the anode of a second diode 235b and indirectly to the negative side of the energy storage capacitor 240 via a filter 245. The positive output of the second full-wave rectifier 220b is connected directly to the cathode of the first diode 235a and indirectly to the positive side of the energy storage capacitor 240 via the filter 245. The negative output of the second full-wave rectifier 220b is connected to the cathode of the second diode 235b and to the other side of the switch 230b. A monitor circuit, similar to that shown and described with respect to FIG. 1b, closes the switch 230b when the voltage across the energy storage capacitor 240 exceeds a threshold voltage level.

The filter 245 is made from a pair of loosely coupled coils wound on a common core and two capacitors, and serves to further smooth the current into the energy storage capacitor. This smoothing of current has several benefits. First, it helps limit peak currents seen by the rectifiers 220a and 220b and the diodes 235a and 235b. Second, it simplifies the monitoring circuit and reduces the hysteresis band required therein. Third, it limits or eliminates both conducted and radiated high-frequency emissions which can cause noise in other parts of the circuit and interference with the operation of other equipment.

FIG. 2a is a schematic diagram similar to FIG. 2 (monitor circuit eliminated to reduce illustrative clutter) showing current flow in a series-connected mode with the switch 230 closed (again shown as a mechanical switch). Starting on the positive side of the circuit and following current flow through the system, the current exits the positive output of the second rectifier 220*b* and travels through the filter 245, through the capacitor 240, back through the filter 245 and into the negative output of the first rectifier 220*a*. This current, via the secondary winding 210*a*, exits the positive output of the first rectifier 220*a*, flows through the closed switch 230 and into the negative output of the second rectifier 220*b*, returning via the secondary winding 210*b* back to its starting point.

As can be readily verified, diodes 235*a* and 235*b* are both reverse biased and effectively eliminated from the circuit in this mode of operation. This is illustrated by dashed lines connecting to the diodes.

FIG. 2c is a schematic diagram similar to that of FIG. 2, but showing current flow through the circuit in a parallel mode of operation with the switch 230 open. In this mode, the switch is shown connected via dashed lines, indicating that it is out of circuit in this mode of operation. Again following current flow, current flows out of the positive output of the second rectifier 220*b* through the filter 245, through the capacitor 240, back through the filter 245 and through the (now forward biased) diode 235*b* into the negative output of the second rectifier 220*b*, where it returns via the secondary winding 210*b*, to its starting point. Effectively connected in parallel with the current flow path just described, current flows out of the positive output of the first rectifier 220*a*, through the (now forward biased) diode 235*a* (where it joins the current from the first rectifier 220*b*) through the filter 245, through the capacitor 240, back through the filter 245 (after which it departs from the current from the second rectifier 220*a*) and into the negative output of the first rectifier 220*a*, returning via the secondary winding 210*a* to its starting point.

In use, the output stage is connected to the capacitor so that the rectified outputs of the secondary windings are in parallel (switch open—FIG. 2b) up to a threshold voltage across the capacitor, and are in series (switch closed—FIG. 2a) after the threshold has been attained.

Figure 3:
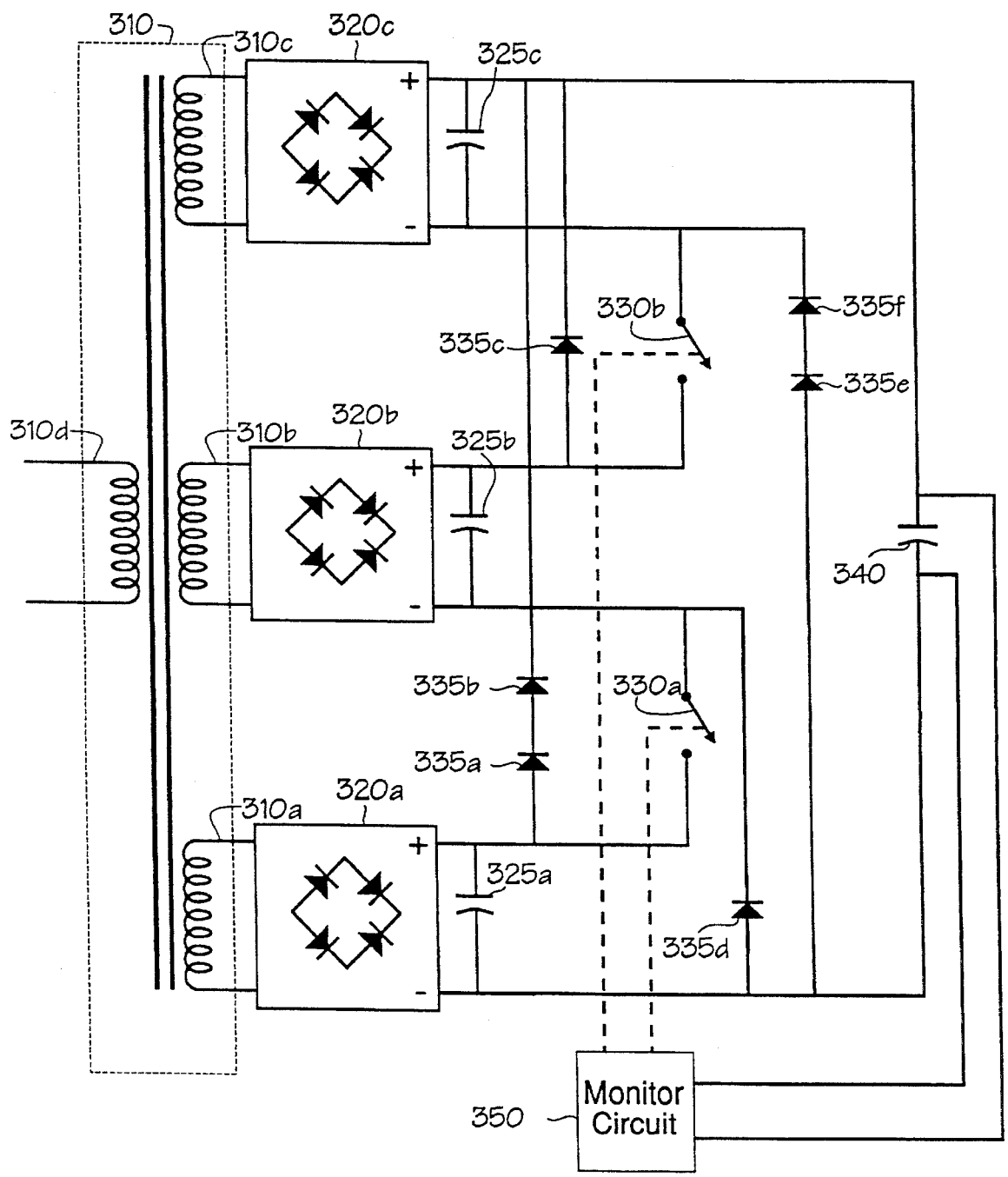
FIG. 3 is a schematic diagram of an output stage of a three-winding series-parallel energy-storage capacitor charging system, according to the invention, illustrating extension of the technique beyond two windings.

FIG. 3 illustrates an embodiment of the inventive technique in a power supply employing three (or more) secondary windings. (Note that filter components such as those described with respect to FIGS. 2–2b are omitted, since they are not essential to the inventive switching technique. Even numbers of windings are preferred, to allow intermediate series/parallel switching when four or more windings are used.

In the three winding arrangement, a transformer 310 with three secondary windings 310*a*, 310*b*, and 310*c*, and a single primary winding 310*d* is assumed to have a suitable AC driving signal at its primary winding 310*d*. The resulting AC waveforms at the first, second, and third secondary windings 310*a*, 310*b*, and 310*c*, are rectified by rectifiers 320*a*, 320*b*, and 320*c*, respectively, and filtered by filer capacitors 325*a*, 325*b*, and 325*c*, respectively. The positive output of the first rectifier 320*a* is connected to the anode of a first diode 335*a* and to one side of a first switch 330*a* (preferably an electronic switch). The cathode of the first diode 335*a* is connected to the anode of a second diode 335*b*. The cathode of the second diode 335*b* is connected to the positive output of the third rectifier 320*c*, which is further connected to the positive side of an energy storage capacitor 340. The positive output of the second rectifier 320*b* is connected to the anode of a third diode 335*c* and to one side of a second switch 330*b* (preferably an electronic switch). The cathode of the third diode 335*c* is connected to the positive output of the third rectifier 320*c*. The negative output of the first rectifier 320*a* is connected to the negative side of the energy storage capacitor 340, to the anode of a fourth diode 335*d* and to the anode of a fifth diode 335*e*. The cathode of the fourth diode 335*d* is connected to the negative output of the second rectifier 320*b* and to the opposite side of the first switch 330*a*. The cathode of the fifth diode 335*e* is connected to the anode of a sixth diode 335*f*. The cathode of the sixth diode 335*f* is connected to the negative output of the third rectifier 320*c*. A monitor circuit 350 monitors the voltage across the capacitor 340 and controls closure of the switches 330*a* and 330*b*.

The "doubled-up" diode pairs 335*a*/335*b* and 335*e*/335*f* are provided to even up diode drops in the parallel-connected configuration. In other words, currents flowing from/to the second rectifier 320*b* also experience two diode drops through diodes 335*c* and 335*d*.

If the inventive technique were extended to four or more windings, each of the "inner" windings would have components and connections similar to those shown for the second winding 310*b*, each having a single diode in series with each of the rectifier. Since there would be two diode drops for each "inner" winding, the outer windings, which would have components and connections similar to those shown for windings 310*a* and 310*c*, would require doubled-up diodes so that current-sharing between the windings will function properly.

Figure 3A:
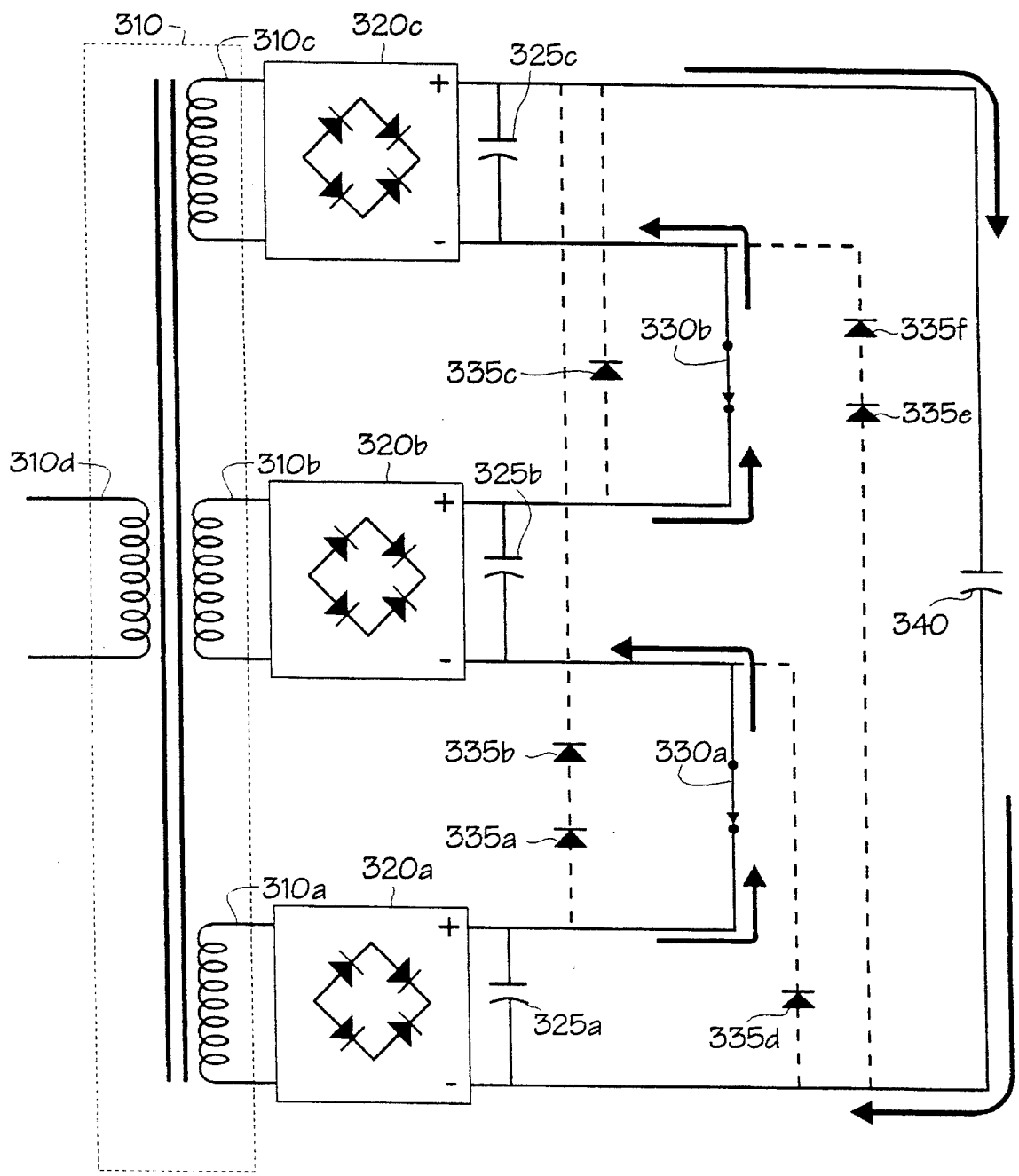
FIG. 3a is a "switch-closed" version of the schematic diagram of FIG. 3 showing current flow for the series output configuration.

FIG. 3a is a repetition of the schematic of FIG. 3, (monitor circuit omitted to reduce illustrative clutter) showing current flow for a series connected configuration with the switches 330*a* and 330*b* closed. In this configuration, as can be easily verified, all of the diodes 335*a–f* are reverse biased, effectively removing them from the circuits. This is illustrated by showing connections to the diodes as dashed lines. Current flows out of the positive output of the third rectifier 320*c*, through the capacitor 340, into the negative output of the first rectifier 320*a*, through the first secondary winding 310*a*, out of the positive output of the first rectifier 320*a*, through the closed first switch 330*a*, into the negative output of the second rectifier 320*b*, through the second secondary winding 310*b*, out of the positive output of the second rectifier 320*b*, through the closed second switch 330*b*, into the negative output of the third rectifier 320*c*, and through the third secondary winding 310*c* back to its starting point.

Figure 3B:
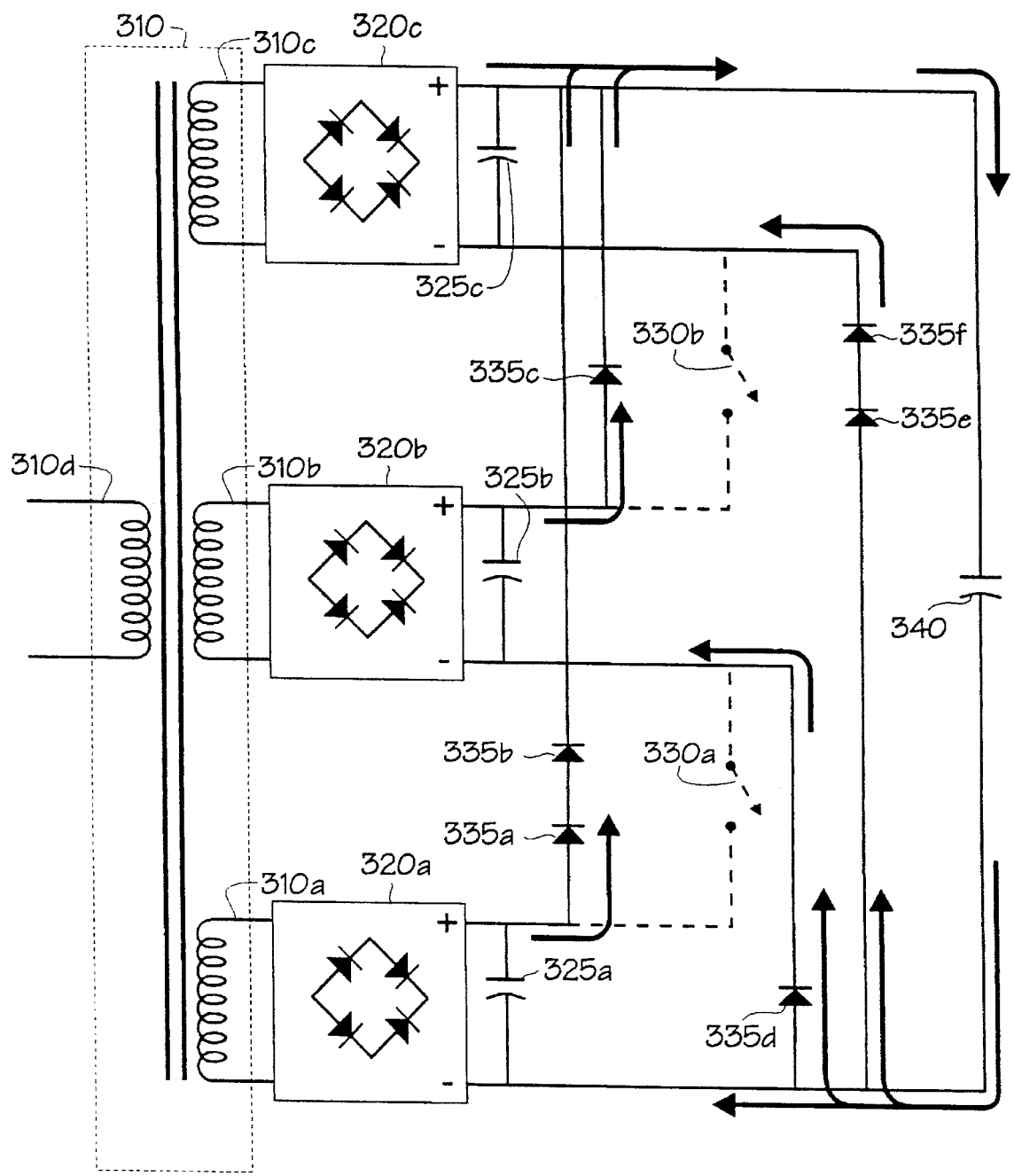
FIG. 3b is a "switch-open" version of the schematic diagram of FIG. 3, showing the parallel configuration current flow.

FIG. 3b is a schematic diagram similar to FIG. 3a, but showing current flow in a parallel (current-sharing) mode of circuit operation with the switches 330 and 330*b* open. Since the switches 330*a* and 330*b* are effectively out of circuit, connections to the switches 330*a* and 330*b* are shown as dashed lines. In the parallel-connected mode, currents from the three windings 310*a*, 310*b*, and 310*c* flow as follows:

For the first secondary winding 310*a*, current flows out of the positive output of the first rectifier 320*a*, through the stacked first and second diodes 335*a* and 335*b*, (now joining currents from the second and third secondary windings) through the capacitor 340, (now parting from currents from the second and third secondary windings) into the negative output of the first rectifier 320*a*, and through the first secondary winding 310*a* back to its starting point.

For the second secondary winding 310*b*, current flows out of the positive output of the second rectifier 320*b*, through the third diode 335c, (now joining currents from the first and third secondary windings) through the capacitor 340, (now parting from currents from the second and third secondary windings) through the fourth diode 335d, into the negative output of the second rectifier 320b, and through the second secondary winding 310b back to its starting point.

For the third secondary winding 310c, current flows out of the positive output of the third rectifier 320c, (now joining currents from the first and second secondary windings) through the capacitor 340, (now parting from currents from the second and third secondary windings) through the stacked fifth and sixth diodes 335e and 335f, into the negative output of the third rectifier 320c, and through the third secondary winding 310c back to its starting point.

The output stage configuration described hereinabove with respect to FIG. 3 is most useful in the configurations shown, with all of the rectified outputs of the windings switched from a parallel (current-sharing) to a series (enhanced charging voltage) connection.

Figure 4:
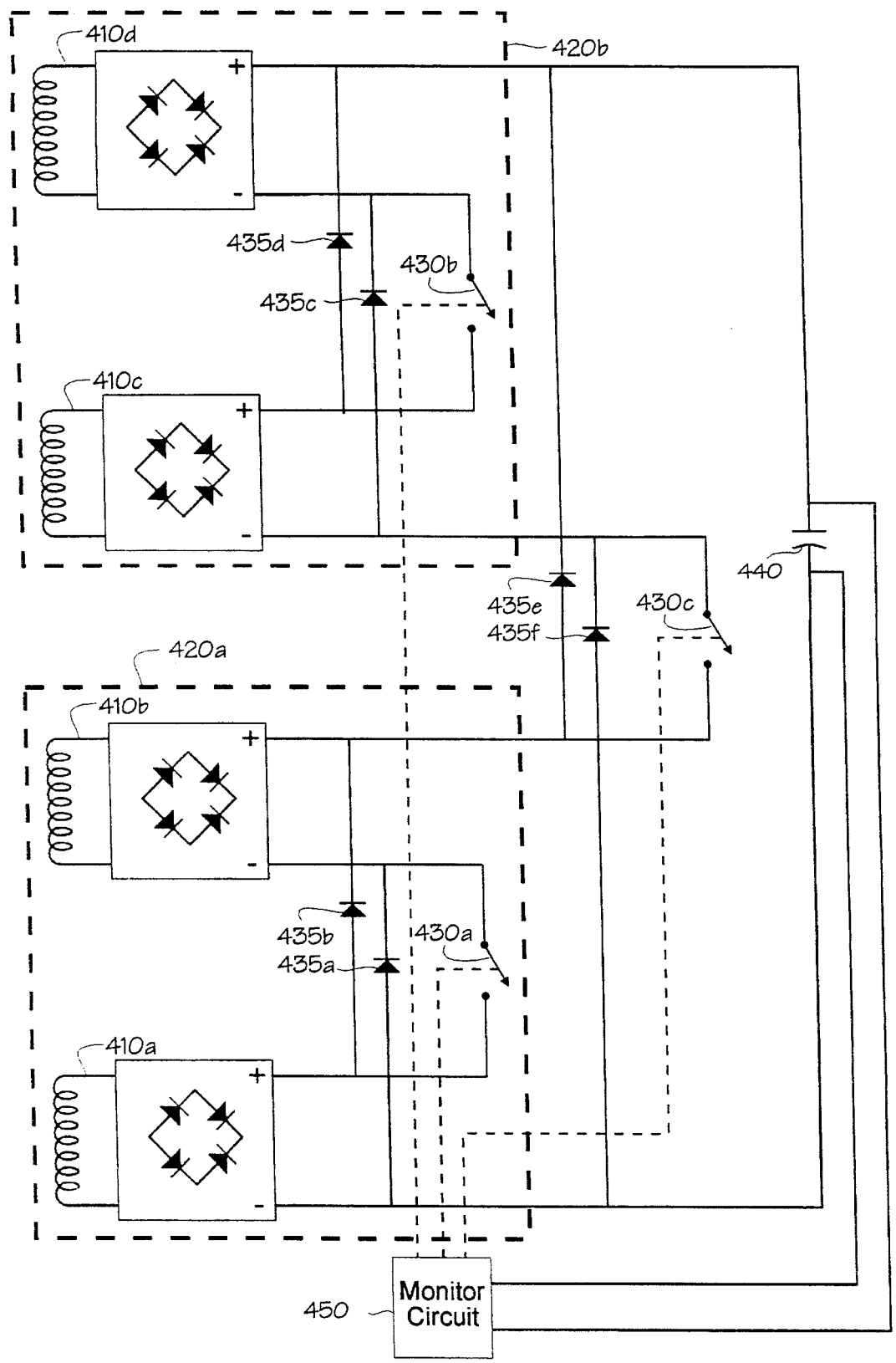
FIG. 4 is a schematic diagram of a four-winding, two-stage, cascaded series-parallel charging system, according to the invention.

FIG. 4 is a schematic diagram of an output configuration for a capacitor charging system which extends the inventive technique to multi-stage switching of binary multiples of windings.

In the output configuration shown in FIG. 4, four secondary windings 410a, 410b, 410c, and 410d of a transformer are arranged into two series-parallel switched pairs 420a and 420b, each configured as described hereinabove with respect to FIG. 1a. One series-parallel switched pair 420a utilizes secondary windings 410a and 410b, which are series-parallel switched by two diodes 435a and 435b and a first switch 430a as described in detail hereinabove. The other series-parallel switched pair 420b utilizes secondary windings 410c and 410d, which are series-parallel switched by two diodes 435c and 435d and a second switch 430b. The two series-parallel switched pairs 420a and 420b are in turn series-parallel switched by two diodes 435e and 435f and a third switch 430c, to charge an energy storage capacitor 440. A monitor circuit 450 controls the closures of the three switches.

Preferably, there are two critical voltage thresholds for the monitor circuit 450, one higher than the other. If the voltage is below both thresholds, then the monitor circuit opens all of the switches 430a–c, placing the current from secondary windings 410a and 410b in parallel, the current from secondary windings 410c and 410d in parallel, and the current form each of the pairs of windings (420a and 420b) in parallel with each other. In this way, all four secondary windings 410a–d are effectively connected in parallel to provide four times the charging current which would be available from any one winding alone.

If the voltage across the capacitor 440 is above the lower of the two voltage threshold, then the monitor circuit 450 can either close switch 430c and open switches 430a and 430b, or it can close switches 430a and 430b and open switch 430c. In the former case, the current from windings 430a and 430b in parallel is connected conducted in series with current from windings 430c and 430d in parallel. This provides twice the current which would be available from any one winding alone at twice the voltage available from any one winding alone. In the latter case, the current and voltage results are the same, but are accomplished with the parallel combination of windings 420a and 420b in series and 420c and 420d in series.

If the voltage across the capacitor 440 exceeds the second voltage threshold, then the monitor circuit 450 closes all of the switches 430a–c, effectively placing the current from all of the windings 410a–d in a series-conducting arrangement providing four times the voltage available from any single winding alone at a current equal to that available from each winding alone.

By providing two current/voltage steps rather than one, charging efficiency is improved over that provided by single-stage series-parallel switching arrangements.

It will be readily appreciated by one of ordinary skill in the art that the monitor circuit 450 can be implemented as a pair of level detectors set to different threshold voltages, with one of the level detectors controlling switches 430a and 430b and the other level detector controlling switch 430c.

Based on the disclosure contained herein, it will also be appreciated by one of ordinary skill in the art that the two-stage, four-winding series-parallel switching scheme of FIG. 4 scheme can be similarly extended to a three-stage, eight-winding scheme, using three threshold voltages, etc.

It should be understood by one skilled in the art that the terms "positive" and "negative", as well as the terms "anode" and "cathode" could be reversed so that the entire output stage can be reversed in polarity.

What is claimed is:

1. Method of charging a capacitor, comprising:

providing two rectified current supplies;

providing switching means, consisting essentially of two diodes and a single switch connected to the two rectified current supplies;

switching the rectified current supplies into a parallel connected configuration, by causing the switch to be open, and charging a capacitor; and switching the rectified current supplies into a series connected configuration, by causing the switch to be closed, and further charging the capacitor;

wherein during charging and further charging of the capacitor, a load is imposed on the two rectified current supplies and the load is shared equally by each of the two rectified current supplies;

further comprising:

providing two additional rectified current supplies, the two additional rectified current supplies sharing equally in the load with each other and with the two rectified current supplies;

providing additional switching means consisting essentially of two additional diodes and an additional switch connected to the two additional rectified current supplies;

switching the two additional rectified current supplies into a parallel connected configuration, by causing the additional switch to be open, for charging the capacitor; and switching the additional rectified current supplies into a series connected configuration, by causing the additional switch to be closed, for further charging the capacitor.

2. Method of charging a capacitor, according to claim 1, further comprising:

monitoring a voltage across the capacitor;

controlling the single switch in response to the voltage monitored across the capacitor.

3. Method, according to claim 1, further comprising:

providing further switching means consisting essentially of at least two further diodes and a single further switch connected to the two rectified current supplies and to the two additional rectified current supplies;

switching the two rectified current supplies and the two additional rectified current supplies into a parallel connected configuration, by causing the further switch to be open, for charging the capacitor; and switching the two rectified current supplies and the two additional rectified current supplies into a series connected configuration, by causing the further switch to be closed, for further charging the capacitor.

4. Power supply for charging a capacitor, comprising:

a transformer having a primary winding and having a number, at least two, of secondary windings;

means for providing an alternating current driving waveform across the primary winding of the transformer;

a number, at least two, of rectifiers of the single-junction type, wherein the number of rectifiers is equal to the number of secondary windings, each one of the at least two rectifiers connected to rectify alternating current from a respective one of the secondary windings, each one of the at least two rectifiers providing a respective positive output, and each one of the at least two rectifiers providing a respective negative output;

one of the positive outputs being a positive charging output, all but the one of the positive outputs being remaining positive outputs, wherein there is a number, at least one, of remaining positive outputs;

one of the negative outputs being a negative charging output, all but the one of the negative outputs being remaining negative outputs, wherein there is a number, at least one, of remaining negative outputs;

a first number of first current rectifying devices, equal in number to the number of remaining positive outputs, each of the first current rectifying devices connected by an anode terminal to a respective one of the remaining positive outputs and connected by a cathode terminal to the positive charging output, wherein, in the case of there being three or more secondary windings, a first portion of the first number of the first current rectifying devices being a pair of diodes connected in series with one another, a second portion of the first number of the first current rectifying device being single diodes;

a second number of second current rectifying devices, equal in number to the number of remaining negative outputs, each of the second current rectifying devices connected by a cathode terminal to a respective one of the remaining negative outputs and connected by an anode terminal to the negative charging output, wherein, in the case of there being three or more secondary windings, a first portion of the second number of the second current rectifying devices being a pair of diodes connected in series with one another, a second portion of the second number of the second current rectifying device being single diodes;

a number, one less than the number of secondary windings, of control switches, each control switch having a first terminal and a second terminal; and for each of the control switches, the first terminal is connected to one of the remaining positive outputs associated with a first selected one of the rectifiers, and the second terminal is connected to one of the remaining negative outputs associated with a second selected one of the rectifiers.

5. Power supply, according to claim 4, further comprising:

a capacitor connected between the positive charging output and the negative charging output.

6. Power supply, according to claim 4, further comprising:

means, responsive to a voltage between the positive charging output and the negative charging output, for controlling the control switches.

7. Power supply, according to claim 4, wherein:

the diodes of the first and second current rectifying devices consist essentially of single-junction diodes.

8. Power supply, according to claim 4, wherein:

the number of secondary windings is exactly two.

9. Method of charging a capacitor, comprising:

providing at least two rectified current supplies;

providing switching means, consisting essentially of two diodes and a single switch connected to the two rectified current supplies;

switching the rectified current supplies into a parallel connected configuration, and charging a capacitor;

switching the rectified current supplies into a series connected configuration, and further charging the capacitor;

providing at least two additional rectified current supplies;

providing additional switching means consisting essentially of two additional diodes and an additional switch connected to the two additional rectified current supplies;

switching the additional rectified current supplies into a parallel connected configuration, by causing the additional switching means to be open, for charging the capacitor; and switching the additional rectified current supplies into a series connected configuration, by causing the additional switching means to be closed, for further charging the capacitor.

10. Method of charging a capacitor, according to claim 9, further comprising:

monitoring a voltage across the capacitor; and opening, then closing the switching means in response to the voltage monitored across the capacitor.

11. Method, according to claim 9, further comprising:

providing further switching means consisting essentially of two further diodes and a further single switch connected to the two rectified current supplies and to the two additional rectified current supplies;

switching the rectified current supplies and the additional rectified current supplies into a parallel connected configuration, by causing the further switching means to be open, for charging the capacitor; and switching the rectified current supplies and the additional rectified current supplies into a series connected configuration, by causing the further switching means to be closed, for further charging the capacitor.

12. Power supply for charging a capacitor, comprising:

a transformer having a primary winding and having a number of secondary windings, wherein the number of secondary windings is at least two;

means for providing an alternating current driving waveform across the primary winding of the transformer;

a number of rectifiers, equal in number to the number of secondary windings, each rectifier connected to a respective one of the secondary windings to rectify alternating current from the secondary winding, thereby each rectifier providing a positive output and a negative output associated with each secondary winding;

a first selected one of the positive outputs being a positive charging output, all other positive outputs being remaining positive outputs;

a first selected one of the negative outputs being a negative charging output, all other negative outputs being remaining negative outputs;

first at least one first current rectifying devices, equal in number to the number of remaining positive outputs, each first current rectifying device connected by an anode terminal to a respective remaining positive output and by a cathode terminal to the first selected one of the positive outputs, wherein, in the case of there being three or more secondary windings, a first portion of the first at least one first current rectifying devices being a pair of diodes connected in series with one another, a second portion of the first at least one first current rectifying devices being single diodes;

second at least one second current rectifying devices, equal in number to the number of remaining negative outputs, each second current rectifying device connected by a cathode terminal to a respective remaining negative output and by an anode terminal to the first selected one of the negative outputs, wherein, in the case of there being three or more secondary windings, a first portion of the second at least one second current rectifying devices being a pair of diodes connected in series with one another, a second portion of the second at least one second current rectifying devices being single diodes; and a number of control switches, one less in number than the number of secondary windings, each of the control switches having two terminals, a first terminal and a second terminal, wherein the number of control switches is at least one;

wherein:

for each of the control switches, the first terminal is connected to a selected one of the remaining positive outputs of a first selected one of the rectifiers;

for each of the control switches, the second terminal is connected to a selected one of the remaining negative outputs of a second selected one of the rectifiers.

13. Power supply, according to claim 12, further comprising:

a capacitor connected between the positive charging output and the negative charging output.

14. Power supply, according to claim 13, further comprising:

means, responsive to a voltage between the positive charging output and the negative charging output, for controlling the closure of the control switches.

15. Power supply, according to claim 13, wherein:

the first and the second current rectifying devices are single-junction diodes.

16. Power supply, according to claim 13, wherein:

the number of secondary windings is exactly two.

17. Power supply, according to claim 13, wherein:

each of the control switches is a relay.

18. Power supply, according to claim 13, wherein:

each of the control switches is an electronic switch.

19. Power supply, according to claim 18, wherein:

the electronic switch is a transistor.

* * * * *